US011669633B2

(12) United States Patent
Blandin et al.

(10) Patent No.: US 11,669,633 B2
(45) Date of Patent: Jun. 6, 2023

(54) COLLABORATIVE AI ON TRANSACTIONAL DATA WITH PRIVACY GUARANTEES

(71) Applicant: International Business Machines Corporation, Armonk, NY (US)

(72) Inventors: Sebastien Blandin, Singapore (SG); Chaitanya Kumar, Singapore (SG); Karthik Nandakumar, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 16/543,126

(22) Filed: Aug. 16, 2019

(65) Prior Publication Data

US 2021/0049296 A1 Feb. 18, 2021

(51) Int. Cl.
*G06F 21/62* (2013.01)
*G06N 20/00* (2019.01)
(Continued)

(52) U.S. Cl.
CPC .......... *G06F 21/6236* (2013.01); *G06F 30/27* (2020.01); *G06N 20/00* (2019.01);
(Continued)

(58) Field of Classification Search
CPC ............. G06F 21/6235; G06F 21/6245; G06F 21/6236; G06F 30/27; G06N 20/00;
(Continued)

(56) References Cited

U.S. PATENT DOCUMENTS 6,834,272 B1 12/2004 Naor et al.
2015/0161398 A1 6/2015 De Cristofaro et al.
(Continued)

FOREIGN PATENT DOCUMENTS

WO 2014049605 A1 4/2017
WO 2017222902 A1 12/2017

OTHER PUBLICATIONS

Martin Abadi et al. "Deep Learning with Differential Privacy", Proceedings of the 2016 ACM SIGSAC Conference on Computer and Communications Security, pp. 308-318. ACM, 2016.
(Continued)

*Primary Examiner* — Huan V Doan
(74) *Attorney, Agent, or Firm* — Harrington & Smith

(57) ABSTRACT

A data intersection is assessed of data to be used between at least two parties. The data is to be used in an artificial intelligence (AI) application. Evaluation is performed of set of instructions required for the AI application, where the evaluation creates a modified set of instructions where operands are symbolically associated with corresponding privacy levels. Using the assessed data intersection and the modified set of instructions, a mapping is created from the data to operands with associated privacy metrics. The mapping treats overlapping data from the assessed data intersection differently from data that is not overlapping to improve privacy relative to without the mapping. The AI application is executed using the data to produce at least one parameter of the AI application. The at least one parameter is output for use for a trained version of the AI application. Apparatus, methods, and computer program products are described.

20 Claims, 8 Drawing Sheets

(51) Int. Cl.
　　　*G06F 30/27* (2020.01)
　　　*H04L 45/02* (2022.01)
　　　*H04L 41/16* (2022.01)
　　　*G06N 3/08* (2023.01)
　　　*G05D 1/00* (2006.01)
　　　*G01R 31/28* (2006.01)

(52) U.S. Cl.
　　　CPC .............. *H04L 41/16* (2013.01); *H04L 45/08* (2013.01); *G01R 31/2846* (2013.01); *G05B 2219/33002* (2013.01); *G05D 1/0088* (2013.01); *G06N 3/08* (2013.01)

(58) Field of Classification Search
　　　CPC ........ G06N 3/08; G06N 3/0445; G06N 3/044; G06K 9/6267; G06Q 40/04; G06H 50/20; H04L 41/16; H04L 45/08; G01R 31/2846; G05B 2219/33002; G05D 1/0088
　　　See application file for complete search history.

(56) References Cited

U.S. PATENT DOCUMENTS

| | | | | |
|---|---|---|---|---|
| 2018/0039794 | A1* | 2/2018 | Sher-Jan | G06F 21/554 |
| 2018/0288211 | A1* | 10/2018 | Kim | H04M 1/72436 |
| 2019/0156213 | A1* | 5/2019 | Tsuzuku | G06N 3/04 |
| 2019/0392155 | A1* | 12/2019 | Eldefrawy | H04L 63/0428 |
| 2020/0042828 | A1* | 2/2020 | Silberman | G06N 5/046 |
| 2020/0065654 | A1* | 2/2020 | Lee | G06N 3/0454 |
| 2020/0387637 | A1* | 12/2020 | Koren | H04L 63/0236 |
| 2021/0209247 | A1* | 7/2021 | Mohassel | A63B 21/222 |
| 2022/0050918 | A1* | 2/2022 | Macedo | G06F 21/6245 |

OTHER PUBLICATIONS

Borja Balle et al, "Privacy Amplification by Subsampling: Tight Analyses via Couplings and Dvergences" 32nd Conference on Neural Information Processing Systems (NeurIPS 2018), Montreal, Canada.
Raef Bassily et al., "Differentially Private Empirical Risk Mnimization: Efficient Algorithms and Tight Error Bounds", arXiv preprint arXiv:1405.7085, 2014.
Kamalika Chaudhuri et al. "Differentially Private Empirical rRsk Minimization.", Journal of Machine Learning Research, 12(Mar):1069-1109, 2011.
Cynthia Dwork et al., "Calibrating Noise to Sensitivity in Private Data Analysis", In Theory of Cryptography Conference, pp. 265-284. Springer, 2006.
Úlfar Erlingsson et all, "Amplification by Shuffling: From Local to Central Differential Privacy via Anonymity", arXiv:1811.12469v1 [cs.LG] Nov. 29, 2019.
Vitaly Feldman et al., "Privacy Amplification by Iteration", IEEE 59th Annual Symposium on Foundations of Computer Science (FOCS), pp. 521-532. IEEE, 2018.
8. Shiva Prasad Kasiviswanathan et al., "What Can We Learn Privately", 2008 49th Annual IEEE Symposium on Foundations of Computer Science.
Vladimir Kolesnikov et al., "Practical Multi-party Private Set Intersection from Symmetric-key Techniques", ACM CCS 2017.
Ryan McDonal et al. "Distributed Training Strategies for the Structured Perceptron" Human Language Technologies: The 2010 Annual Conference of the North American Chapter of the Association for Computational Linguistics, pp. 456-464. Association for Computational Linguistics, 2010.
Brendan McMahan et al., "Communication-Efficient Learning of Deep Networks from Decentralized Data", Proceedings of the 20th International Conference on Artificial Intelligence and Statistics (AISTATS) 2017, Fort Lauderdale, FL 2017.
H. Brendan McMahan et al., "Learning Differentially Private Recurrent Language Models", published as a conference paper at ICLR 2018, arXiv:17106963v3 [cs.LG] Feb. 24, 2018.
Kentaro Minami et al., :Differential Privacy Without Sensitivity., Advances in Neural Information Processing Systems, pp. 956-964, 2016.
Ilya Mironov, "Rényi Differential Privacy", 2017 IEEE 30th Computer Security Foundations Symposium (CSF), pp. 263-275. IEEE, 2017.
Kobbi Nissim et al., "Smooth Sensitivity and Sampling in Private Data Analysis", Proceedings of the thirty-ninth annual ACM symposium on Theory of computing, pp. 75-84. ACM, 2007.
Manas Pathak et al., "Multiparty Differential Privacy via Aggregation of Locally tTained Classifiers", Advances in Neural Information Processing Systems, pp. 1876-1884, 2010.
Reza Shokri et al., "Privacy-Preserving Deep Learning", Proceedings of the 22nd ACM SIGSAC cConference on Computer and Communications Security, pp. 1310-1321. ACM, 2015.
Adam Smith, "Privacy-Preserving Statistical Estimation with Optimal Convergence Rates", Proceedings of the forty-third annual ACM symposium on Theory of computing, pp. 813-822. ACM, 2011.
John Tsitsiklis et al., "Distributed Asynchronous Deterministic and Stochastic Gradient Optimization Algorithms", IEEE Transactions on Automatic Control, 31(9):803-812, 1986.
Martin Zinkevich et al., "Parallelized Stochastic Gradient Descent", Advances in Neural Information Processing Systems, pp. 2595-2603, 2010.
Qiang Yang et al., "Federated Machine Learning: Concept and Applications", ACM Trans. Intell. Syst. Technol., vol. 10, No. 2, Article 12, Published Feb. 2019.

\* cited by examiner

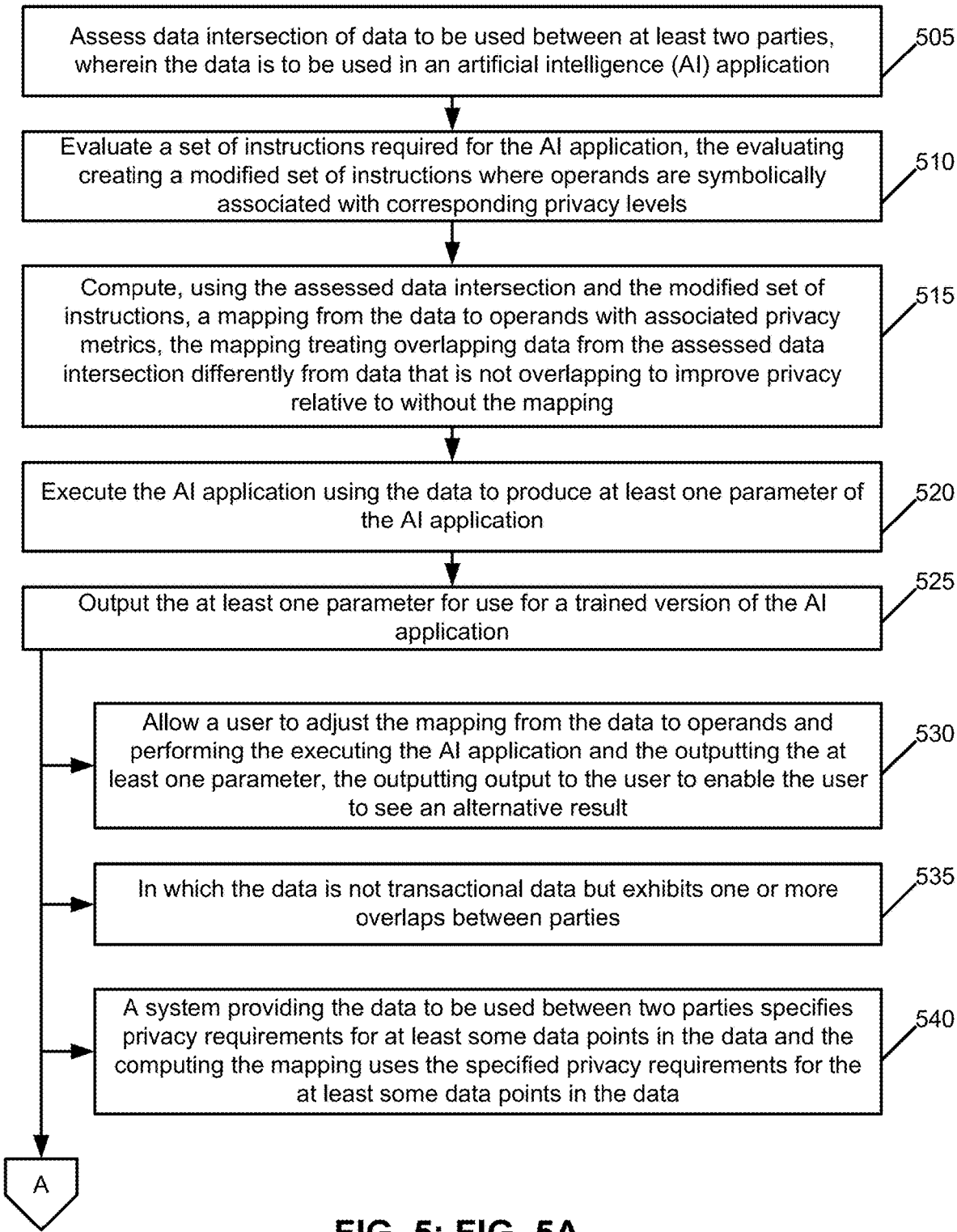
FIG. 5: FIG. 5A

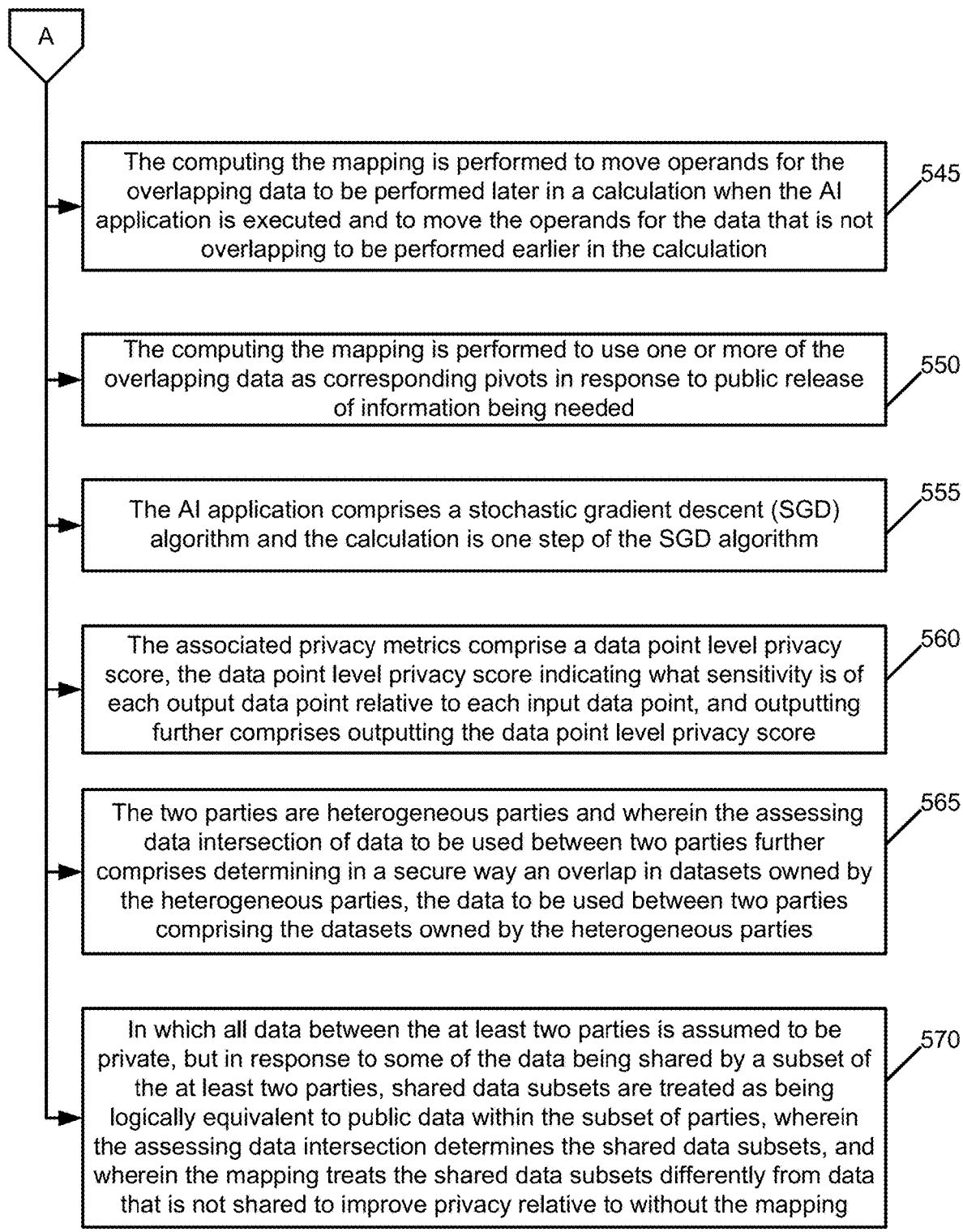
FIG. 5: FIG. 5B

Algorithm 1 Collaborative SGD via HC: each party processes his truly private data first, then the data he shares with the next party. At the end of one cycle, the last party holds the estimate.

Input: Distributed dataset $(\mathcal{D}_1, \cdots, \mathcal{D}_m)$, ordering $\pi$, intersections $O_i = \mathcal{D}_i \cap \mathcal{D}_{\pi(i)}$, objective function $f(\cdot, \cdot)$, starting point $w_0$, noise $\zeta = \mathcal{N}(0, \sigma^2)$
for $k \in \{\pi(1), \cdots, \pi(m)\}$ do
    $w_{k,0} = w_{k-1}$
    for $x \in \mathcal{D}_k \setminus O_k$ do
        $w_{k,t+1} = w_{k,t} - \eta \left( \nabla_w f(w_{k,t}, x) + \zeta \right)$
    end for
    for $x \in O_k$ do
        $w_{k,t+1} = w_{k,t} - \eta \left( \nabla_w f(w_{k,t}, x) + \zeta \right)$
    end for
    Send $w_k := w_{k,|\mathcal{D}_k|}$ to party $\pi(k+1)$
end for

FIG. 8

COLLABORATIVE AI ON TRANSACTIONAL DATA WITH PRIVACY GUARANTEES

BACKGROUND

This invention relates generally to privacy and, more specifically, relates to improving privacy in collaborative learning via, e.g., artificial intelligence.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

Most enterprises are well advanced on their digital transformation path and increasing volumes of data exist in a form that makes it usable by algorithms. Most data records are transactional in nature, in that they involve multiple parties, typically the executer of the action and the impacted entities, e.g., buyer/seller. A dataset is called transactional if every atomic data point is held by multiple parties.

Privacy regulations render complex data-driven actions increasingly constrained, as each enterprise must comply with residency, governance, and privacy regulations. The intersection of these regulations across interacting parties is a significant challenge. The challenge is even more significant in the context of collaborative learning between parties to build Artificial Intelligence (AI) models using the overall dataset owned by the union of parties. This requires sharing of data, which reduces privacy.

SUMMARY

This section is meant to be exemplary and not meant to be limiting.

In an exemplary embodiment, a method includes assessing data intersection of data to be used between at least two parties, wherein the data is to be used in an artificial intelligence (AI) application. The method includes evaluating a set of instructions required for the AI application, the evaluating creating a modified set of instructions where operands are symbolically associated with corresponding privacy levels. The method also includes computing, using the assessed data intersection and the modified set of instructions, a mapping from the data to operands with associated privacy metrics. The mapping treats overlapping data from the assessed data intersection differently from data that is not overlapping to improve privacy relative to without the mapping. The method also includes executing the AI application using the data to produce at least one parameter of the AI application. The method includes outputting the at least one parameter for use for a trained version of the AI application.

In a further exemplary embodiment, an apparatus includes one or more memories having computer-readable code thereon and one or more processors. The one or more processors, in response to retrieval and execution of the computer-readable code, cause the apparatus to perform operations comprising: assessing data intersection of data to be used between at least two parties, wherein the data is to be used in an artificial intelligence (AI) application; evaluating a set of instructions required for the AI application, the evaluating creating a modified set of instructions where operands are symbolically associated with corresponding privacy levels; computing, using the assessed data intersection and the modified set of instructions, a mapping from the data to operands with associated privacy metrics, the mapping treating overlapping data from the assessed data intersection differently from data that is not overlapping to improve privacy relative to without the mapping; executing the AI application using the data to produce at least one parameter of the AI application; and outputting the at least one parameter for use for a trained version of the AI application.

An additional exemplary embodiment is a computer program product comprising a computer readable storage medium having program instructions embodied therewith. The program instructions are executable by a computer system to cause the computer system to perform operations comprising: assessing data intersection of data to be used between at least two parties, wherein the data is to be used in an artificial intelligence (AI) application; evaluating a set of instructions required for the AI application, the evaluating creating a modified set of instructions where operands are symbolically associated with corresponding privacy levels; computing, using the assessed data intersection and the modified set of instructions, a mapping from the data to operands with associated privacy metrics, the mapping treating overlapping data from the assessed data intersection differently from data that is not overlapping to improve privacy relative to without the mapping; executing the AI application using the data to produce at least one parameter of the AI application; and outputting the at least one parameter for use for a trained version of the AI application.

BRIEF DESCRIPTION OF THE SEVERAL VIEWS OF THE DRAWINGS

FIG. 5, which is partitioned into FIGS. 5A and 5B, is a flowchart of a method for collaborative AI on transactional data with privacy guarantees;

FIG. 8 is an algorithm (Algorithm 1) of collaborative SGD via Hamiltonian cycle (HC), where each party processes his truly private data first, then the data he shares with the next party, and at the end of one cycle, the last party holds the estimate.

DETAILED DESCRIPTION

Figures 1, 2:
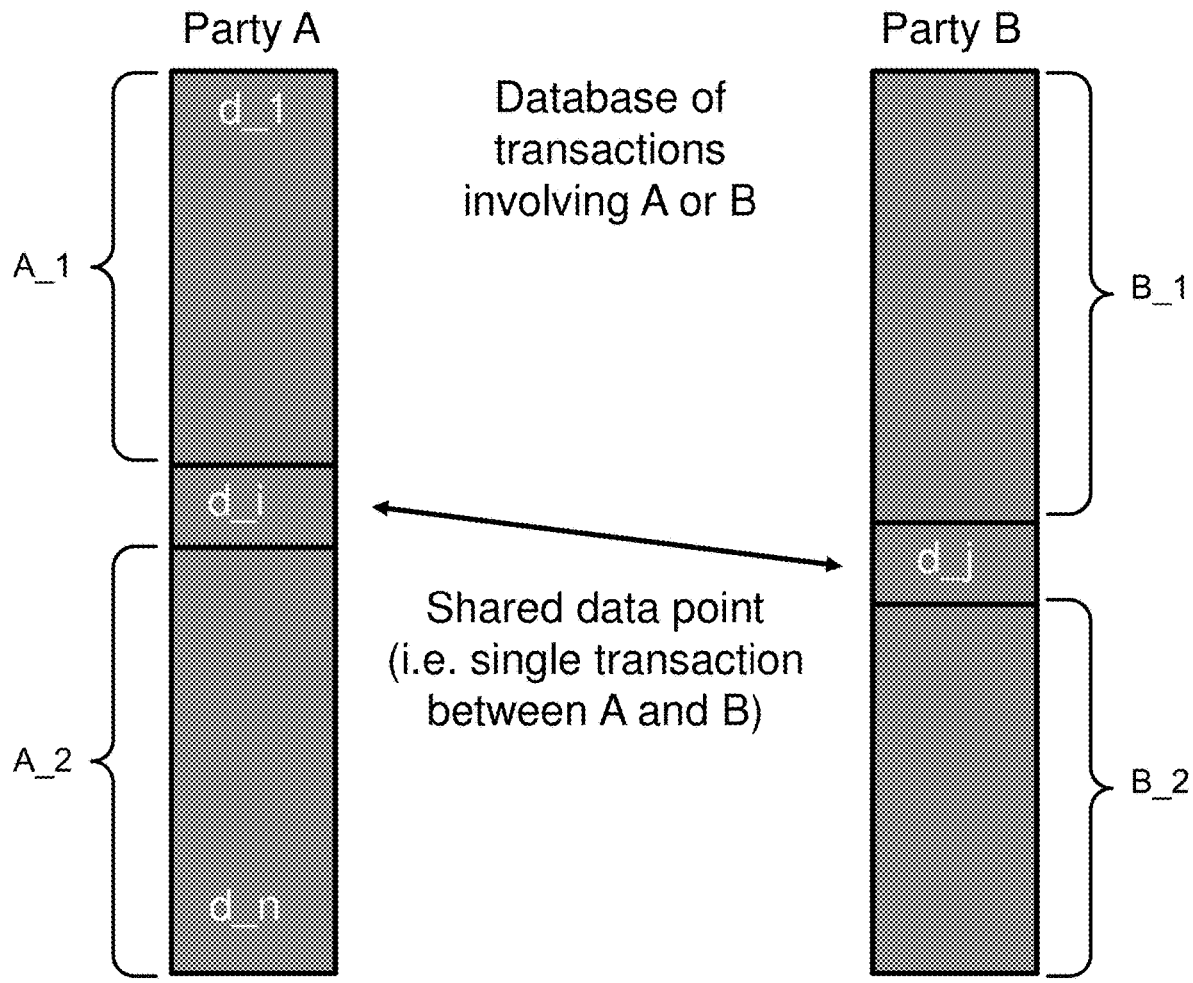
FIG. 1 is a table (Table 1) used to illustrate a concept of leveraging overlapping samples, in accordance with an exemplary embodiment.
FIG. 2 is an illustration of leveraging overlapping samples, regarding using overlapping samples as pivots, for a two-party collaboration.

The following abbreviations that may be found in the specification and/or the drawing figures are defined as follows:

AI Artificial Intelligence
CRDP Collaborative Renyi differentially private
DP Differential privacy
HC Hamiltonian cycle
RDP Renyi differential privacy (or private)
SGD Stochastic gradient descent The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

For ease of reference, the rest of this disclosure is divided into sections.

1. OVERVIEW OF EXAMPLES

As described above, one challenge is in the context of collaborative learning between parties to build AI models using the overall dataset owned by the union of two or more parties. This collaboration may lead to decreased privacy.

This disclosure provides techniques taking advantage of the structure of transactional data to facilitate interaction between parties in particular regarding privacy regulations. In more detail, a problem considered herein concerns differentially private collaborative learning when the collaborating parties happen to share subsets of data. In the context of collaborative model learning using stochastic gradient descent, and in an exemplary embodiment, it is shown that it is possible to leverage these overlapping samples using privacy amplification by iteration to significantly improve the Renyi differential privacy (RDP)/utility trade-off. Specifically, it is shown that the noise required for achieving a target RDP depends on the collaboration structure of the distributed algorithm and demonstrate that direct party-to-party structures such as Hamiltonian cycles are generally preferable to full broadcast, which is typically used in distributed machine learning.

In more general terms, certain exemplary embodiments can be considered as another dimension of complex (e.g., AI) applications. Like an application is expected to 100% meet functional requirements, and different applications achieving that are then evaluated on their memory footprint/runtime/esthetic appeal/and the like. Behind the scene compilers are trying to minimize memory/runtime and other information technology (IT) metrics.

With applications ingesting data, a privacy footprint can be computed and can be optimized herein. This makes sense first for applications with a very large footprint (e.g., AI applications), but conceptually this applies to all applications.

What a user of an exemplary embodiment may receive includes, e.g., a private result, privacy scores, and ways to update that score. A typical user might be a common user who is just satisfied that now he uses a private version of an application. Meanwhile, an expert user might be one who is satisfied that he can now customize, tweak, enhance the privacy performance of his application.

Along the same lines, in the AI world, the techniques presented here can live at different levels. For instance, these techniques can augment the existing cloud-native AI application programmer interfaces (APIs) performing object detection/AI segmentation, and the like, or may exist as an update to the existing libraries doing similar things, or be part of new releases of certain on-premise applications.

2. ADDITIONAL INTRODUCTION AND EXEMPLARY EMBODIMENTS

It is noted that a number of references are cited below in brackets, e.g., "[5]", where the [5] relates to the fifth in a series of references provided below. These references are listed in a "References" section below and also listed in an Information Disclosure Statement provided to the Patent Office.

Introduction Differential privacy (DP), introduced in [5], is a measure of the change in the output distribution of a randomized algorithm across neighboring datasets, where "neighboring" typically refers to addition/removal of the data from one individual.

The initial notion of differential privacy [5] refers to a centralized setting, in which a trusted curator mediates queries from an untrusted party on the centralized data from a set of users. The local model [8] corresponds to the setting where an untrusted party makes queries directly on the dataset from each party.

In certain exemplary embodiments herein, the collaborative setting commonly used in distributed machine learning is considered, in which authenticated entities gather to train a model on the union of their datasets, see for instance the federated learning protocol [11].

A key feature of the collaborative setting is that unlike in the centralized or local differential privacy model, in the collaborative setting the party making the query i) contributes well-defined (confidential) data on his own, ii) has some irreducible knowledge represented by his own dataset.

Furthermore, given that the parties have assembled to work on a common task, towards which they have gathered relevant data, these a-priori private datasets are likely to include overlapping data samples. Such sample overlap may by purely random, or due for instance to side data sharing agreements across parties, or the existence of public samples relevant to the application.

One such application is medical data analysis. For this application, suppose that multiple hospitals contribute data from patients to train an image classifier for automated disease diagnosis. The data contributed by each hospital may include data from individuals who visited one hospital, multiple hospitals, or who agreed to release their data in the public domain. Since the data from individuals of the third type is public, this data is not subject to any privacy constraint. Data from the second type is contextually public, since this data is available to each hospital from the set of hospitals visited, so any exchange of results within that set does not impact the privacy of the individual.

Another application is transaction data. For this application, a large portion of the economy, e.g., finance, logistics, manufacturing, is articulated around transactions across parties. When a subset of these parties is interested in collaborating to learn a model from the overall dataset, for instance to learn a fraud detection model in the financial domain, the collaborating parties rely on transactions involving two parties (sender and receiver), and each data point is present in two a-priori private datasets owned by two distinct parties.

The inventors have realized that knowledge that is shared by a set of parties cannot suffer from privacy leakage within this set of parties. Hence protocols prioritizing communication across parties with common knowledge should yield a better privacy-utility trade-off. One exemplary mechanism to allow for meaningful learning under protection from common knowledge is privacy amplification by iteration.

3.1 Leveraging Overlapping Samples

Privacy amplification by iteration [14] provides sample-level Renyi-differential privacy (RDP) guarantees in the context of iterative applications of noisy contractive mappings.

We instantiate a key result from privacy amplification by iteration informally below for Stochastic Gradient Descent (SGD), which is a commonly used algorithm for AI applications used, e.g., to determine weights in a neural network.

Assumption 1 (Informal). Let a party partition his or her data D into public ($D_{pu}$) and private ($D_{pr}$) sets. Let the party run a SGD pass by first going through the private dataset $D_{pr}$, and then through the data from the public dataset $D_{pu}$. If the result of the SGD pass over the entire dataset is $(\alpha,\varepsilon)$-Renyi differential private, then any sample in the private set $D_{pr}$ is at least $(\alpha,\varepsilon/(1+|D_{pu}|))$-RDP, where $|D_{pu}|$ is the cardinality of the public set.

To illustrate the benefits of leveraging overlapping samples, consider a simple three party scenario. Let AB denote the process of A running a SGD pass on his data and sending the results to B. Let AB denote the dataset that is common to A and B, but unknown to C (in particular with these notations AB∩ABC=Ø). We consider a step of the collaboration when A has to process his data and send the results to B and C.

The first row of Table 1 (see FIG. 1, which is used to illustrate a concept of leveraging overlapping samples, in accordance with an exemplary embodiment) summarizes the privacy gain when A processes its entire data, with the subset shared by all parties last, and broadcasts the results. That is, in Table 1, party A broadcasts its results (top row), A shares its results with each party separately (bottom row). Privacy is compared to last sample from the Public set.

Instead, A could send his or her results to B and C separately, in which case he would process the data in a different order, by ordering the samples that are shared with the party he is sending his results to in last positions. In this case (see the second row of the table), the privacy of the samples in the private dataset $D_{pr}$ increases, because $1/(1+|AB|+|ABC|) \leq 1/(1+|ABC|)$. We emphasize that the dataset labeled as Public Set in Table 1 is shared by both sender and receiver.

As another example of leveraging overlapping samples, consider the following sorting by transaction attribute example. This is illustrated in conjunction with FIG. 2. This figure is an illustration of leveraging overlapping samples, regarding using overlapping samples as pivots, for a two-party collaboration between Party A and Party B.

This example might be finding the slowest transaction involving Party A or Party B, in a supply chain ecosystem. As an overview, each party A and B acknowledges a single shared data point, which is illustrated as d_i for Party A and d_j for Party B. Local sorting is performed by Party A on its records with values greater than d_i, and on its records with values lower than d_i. A private merge is performed between Parties A and B for records with values greater than d_i, and on its records with values lower than d_i. The complexity is 2*Comp ((n−1)/2) instead of naïve Comp(n), which illustrates the benefits from divide-and-conquer for this example. No private information released, and shared data only revealed within set of parties co-owning the shared data, here a single shared transaction, to Parties A and B.

In more detail, there are multiple shared data points in general, since all transactions between Parties A and B are shared by Parties A and B. The problem statement is that Parties A and B want to sort the union on their dataset by a given transaction attribute, e.g., "transaction_core". They would like to use some divide-and-conquer method, where instead of directly sorting the union of their datasets, they can pre-process their data, and then sort a union of smaller subsets. But to divide this process, typically one needs to agree on how to divide, i.e., which data points should serve as pivots. Agreeing on a pivot P means agreeing on dividing the data into two subsets per party A_1, A_2, B_1, B_2 such that all transactions in A_1 have a transaction score ("transaction_score") below the "transaction_score" of data point P, and all transactions in A_2 have a "transaction_score" below the "transaction_score" of data point P. In this example, the data point P is d_i on Party A or d_j on Party B. Then instead of calling a method SORT (A,B), they could call a method CONCATENATE (SORT (A_1, B_1), P, SORT(A_2, B_2)). That is, they can use the data they have in common as pivots—multiple pivots in fact. So they consider their shared transactions P_1, . . . , P_n, then locally sort their data, define data subsets A_1, . . . , A_n such that for each transaction in A_i, the transaction_score value is between that of P_(i−1) and P_i. No privacy is lost since the pivots are already known to both, and local sorting does not incur privacy loss. Then they call their preferred private sort function n times on pairs (A_i, B_i), to get the fully sorted data set. It is more efficient than calling the private sort function once on (A,B).

Figure 3:
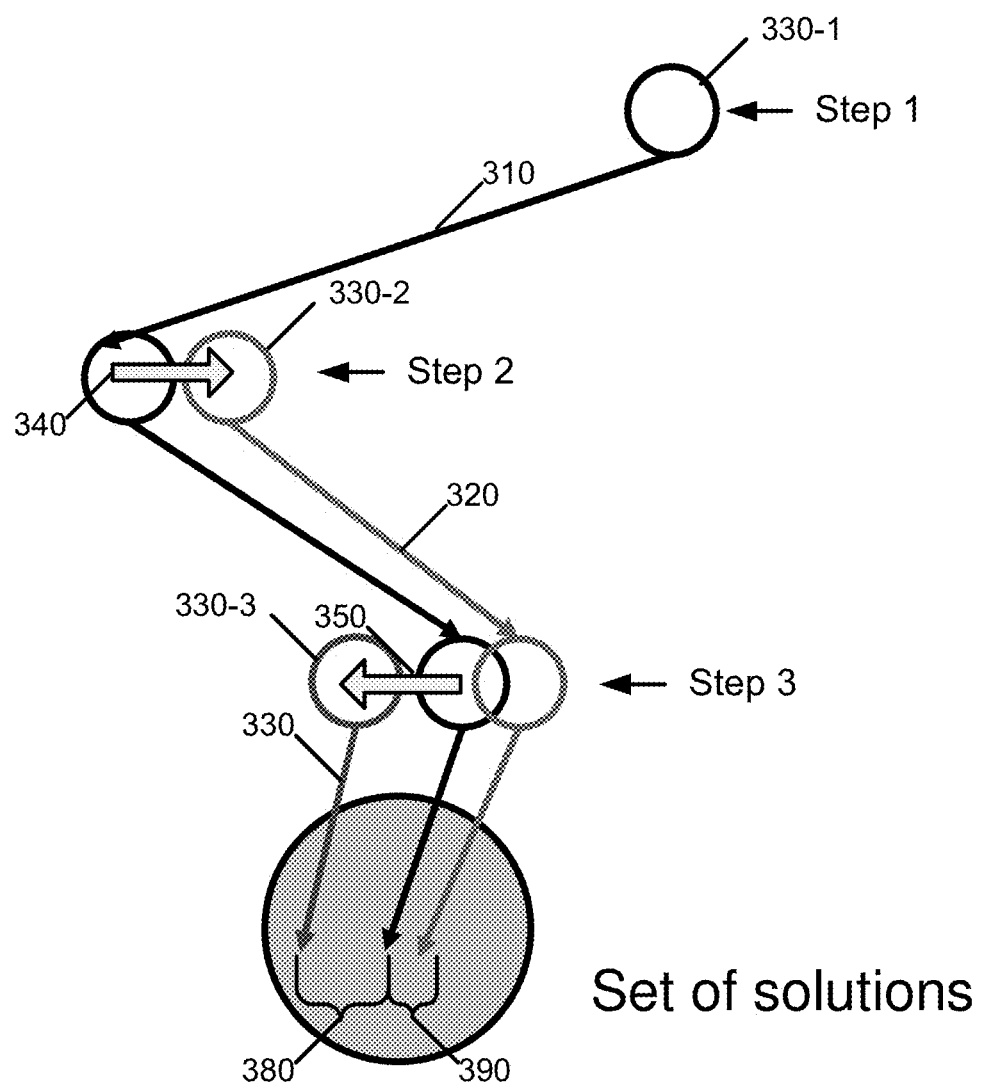
FIG. 3 is an illustration of leveraging overlapping samples in a convergence of a gradient descent process.

Consider another example, which is training a fraud detection AI model that uses Stochastic Gradient Descent (SGD). This uses FIG. 3, which is an illustration of leveraging overlapping samples in a convergence of a gradient descent process. The fraud detection AI model is one that characterizes banking transactions with features of money-laundering. Multiple banks intend to contribute within bank transactions from their customers as well as cross-bank transactions. Noise is added at each step of the stochastic gradient descent update to maintain differential privacy. In the example of FIG. 3, there are three steps (Step 1, Step 2 and Step 3) that are shown, resulting in the set of solutions shown at the bottom. As described in more detail below, data points processed earlier are better protected (more cumulative noise added). Processing shared transactions last in the model yields to better privacy for the non-shared points.

In additional detail, in this process as illustrated by FIG. 3, information is revealed, hence privacy is breached, by the result (the set of solutions) Thus, with some shortcuts, what matters is how much noise is added in the algorithm, between the step when the data point is processed, and the result. So data points processed earlier are better protected, and we propose processing non-shared data points first, since they need to be better protected.

Within an SGD run, a point processed earlier is better protected. Considering two stochastic gradient descent runs with different numbers of steps, and assuming the processing order is the same in both for at least some points, then a given data point is better protected in the run with more steps (because what matters is how far you are from the end of the algorithm, as overall noise content increases with increasing number of steps).

The privacy metric is differential privacy, i.e., by how much does the result change when one data point undergoes a reference change (e.g., changes by 1 (one) in some agreed-upon normalized scale). If resulting change in output is low, the algorithm is considered differentially private, because the result does not depend much on the input. A monotonic function of that change in output is called epsilon, and lower is better. Of course in stochastic gradient descent step each point is processed at a different step, so each point impacts the result differently.

In FIG. 3, consider a run of SGD with three data points (the circles). The arrow denotes where you move in the parameter space due to processing the data point the arrow originates from. Eventually, the algorithm converges to the area marked as the set of solutions. This shows three steps, which is merely for illustration. Three traces 310, 320, and 330 are shown, with corresponding points 330-1, 330-2 and 330-3. Considering the trace 310 as reference, we now analyze what happens if we change a little bit the second point 330-2 or the third point 330-3.

Because the technical assumptions require a contractive process, a typical physical process to think about is a marble falling in a bowl (with a relatively flat bottom corresponding to the "set of solutions" the process converges to), and at defined time points, one nudges the marble a bit (while it is rolling along the bowl's inner surface). What the figure intends to show is that if one nudges (illustrated by arrow 340) the marble early on (the second point 330 processed in Step 2 of the SGD), the marble will end up close to where it would have ended up without perturbation. This is illustrated by reference 390, which illustrates the difference between the ending location of second point 330-2 with respect to the ending location of the first point 330-1. On other hand, if one nudges (illustrated by reference 350) the marble later on (third point 330-3 processed in Step 3 of the SGD)—with the same magnitude—the marble will end up farther from the point it would have converged to without perturbation. This is illustrated by reference 380, which illustrates the difference between the ending location of third point 330-3 with respect to the ending location of the first point 330-1.

Again this works because the process is a contraction, which roughly means that the process really wants to converge to a given spot and absorb perturbations to some extent—with enough time. So perturbations on points processed late impact the result more, hence are less differentially private.

3.2 Summaries of Exemplary Improvements

This section describes a number of exemplary improvements for the exemplary embodiments.

With respect to collaborative Renyi differential privacy, a new definition is formulated of differential privacy appropriate to the collaborative setting. Specifically, this definition accounts for the fact that some of the data may be common to interacting parties, and integrates the fact that the collaborative protocol releases direct query results to subsets of the parties only.

Regarding analysis of impact of communication structures, a communication structure associated with a distributed algorithm is defined and the required noise level for certain exemplary structures is evaluated. Under a simple overlapping data generation process, the privacy of the protocol is analyzed based on iterative full broadcast and Hamiltonian cycle.

Additionally, exemplary embodiments allow training AI models on distributed datasets with native output privacy guarantees, ensuring that the computed information does not depend too much on the data from any specific individual associated with the input data. The exemplary embodiments may treat shared data subsets as contextually public, and integrate this information in the computation via the following two strategies: (1) Uses overlapping data as pivots when public release of information is needed; and (2) Uses only overlapping data for fine-tuning towards the end of the computation when needed. The exemplary embodiments may provide a sensitivity indicator for each data point, as a function of the use (e.g., earlier or later in a SGD process) of the data point, and sharing structure of the data point. A further possible improvement is certain exemplary embodiments may optimize for the data ordering given a set of operations, accounting for both privacy and application accuracy. The exemplary embodiments may provide a trade-off curve between both objectives and indicates whether current allocation lies on an optimal trade-off curve. An optional improvement is an exemplary embodiment that determines in a secure way the overlap in the datasets owned by heterogeneous parties, e.g., discovers that the transaction referring to transfer of ownership from a supplier A to a consumer B is common to both A and B, for instance in case when overlap is non-trivial due to heterogeneous data structures across A and B.

3.3 Other Work

Distributed stochastic gradient descent ([19]) has become the method of choice for distributed optimization, especially for learning model parameters from large datasets (see [10, 20]). In [11], the showed that distributed SGD can also be useful in multi-party and federated learning settings.

The cornerstone of differential privacy is the sensitivity of the algorithm to its input, and a significant body of work has focused on tighter bounds, from the definition of smooth sensitivity in [15, 18], to cases of unbounded losses in [13]. Various techniques have also been proposed for enhancing privacy including privacy amplification by sampling [8] (see [2] for recent results), privacy amplification by shuffling [6], privacy amplification by iteration [7].

Differential privacy in a distributed deep learning setting dates back to the work of [17]. Improved composition bounds and experimental results have been reported in [1] for feed-forward neural networks and in [12] for recurrent neural networks. Private empirical risk minimization has also been studied in [4, 16, 3].

None of this work, however, addresses the understanding of the privacy impact of overlapping samples in a distributed dataset, as described and used herein.

4. EXEMPLARY SYSTEM AND METHODS

Figure 4:
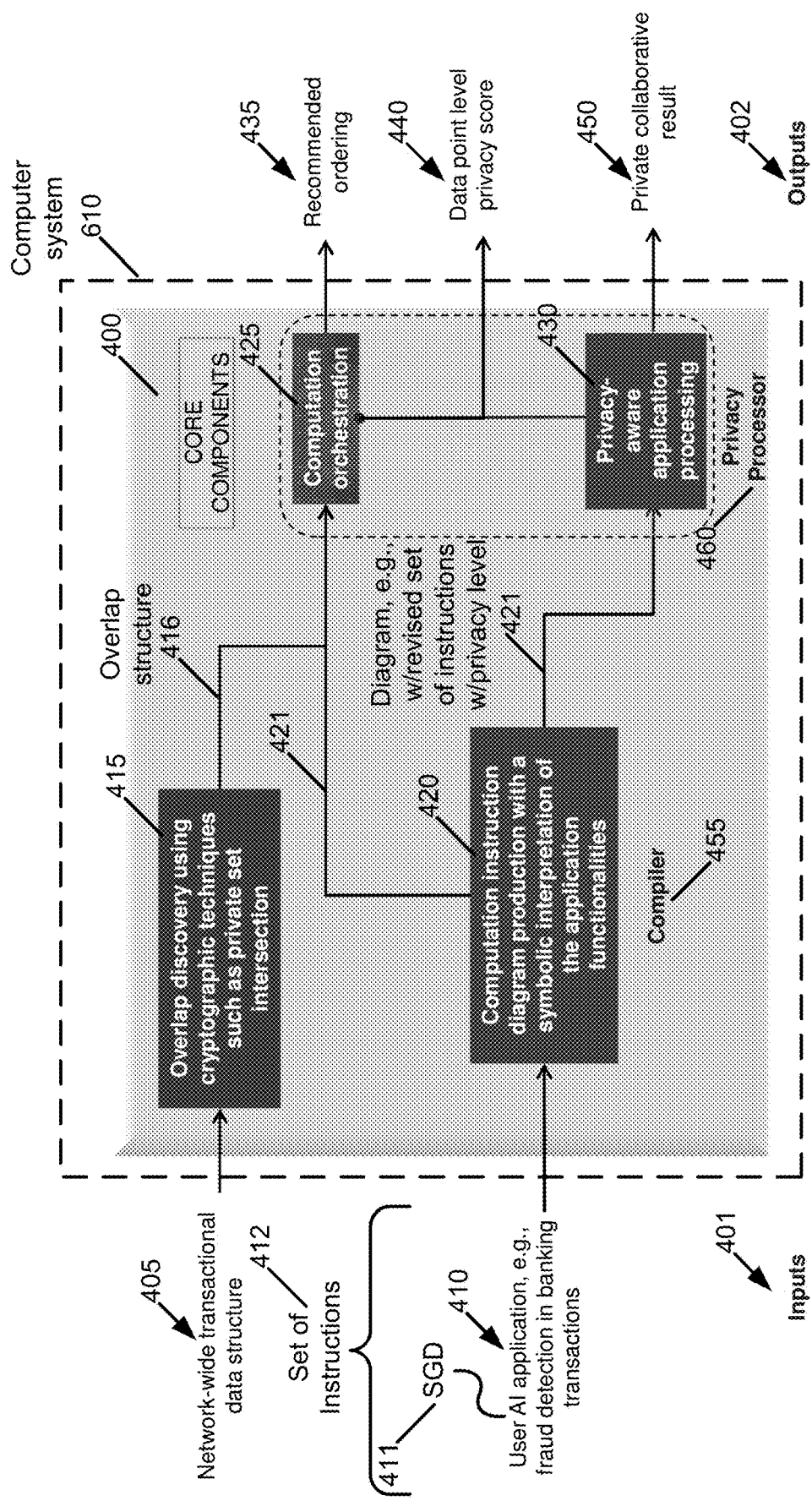
FIG. 4 is a block diagram of core components and their inputs and outputs for an exemplary embodiment.

Turning to FIG. 4, this is a block diagram of core components 400, as implemented by a server computer system 610, and their inputs 401 and outputs 402 for an exemplary embodiment. The core components include the following: an overlap discovery 415 using cryptographic techniques such as private set intersection; a compiler 455 that performs in block 420 computation instruction diagram production with a symbolic interpretation of the application functionalities; a privacy processor 460 that performs in block 430 privacy-aware application processing and in block 425 computation orchestration. The inputs 401 include a network-wide transactional data structure 405, which is input to the overlap discovery component 415. The overlap discovery component 415 may use cryptographic techniques such as private set intersection. That is, the overlap discovery component may generate the (e.g., trivial) overlap structure 416 from known party identifiers, or may run a secure protocol (e.g., using cryptographic techniques) to privately evaluate the overlap between data points across parties. An example of this overlap has been illustrated in FIG. 2.

The inputs 401 also include a user AI application 410, e.g., for fraud detection in banking transactions, which is applied to the compiler 455. The user AI application 410 comprises an SGD algorithm 411, in an exemplary embodiment. The user AI application 410 comprises a set of instructions 412. The compiler 455 performs in block 420 the computation instruction diagram production with a symbolic interpretation of the application functionalities. Put differently, the computation instruction diagram production component 420 leverages a language compiler 455 to produce a diagram with (w/) a revised set of instructions 421 and corresponding privacy level. The application 410 needs to have the revised set of instructions executed. An addition in the diagram 421 is that each operand is symbolically associated with a privacy level, which is the symbolic interpretation in block 420. For instance in a sorting algorithm, the pivot operand is associated with a low privacy level in a symbolic manner. As is known, an operand is the part of a computer instruction that specifies data that is to be operated on or manipulated and, by extension, the data itself. In further detail, all logical arithmetic elements are either operands (the variables) or operators (the function). The term "operand" is used herein because the exemplary embodiments work at the symbolic level, i.e., the differential privacy of the application depends on the set of instructions for the application and their structure, not on the numerical values.

Thus, a first step is to convert code (e.g., the set of instructions 412) into workable material, i.e. using a compiler 455, which simply creates a structured representation of the program as the diagram 421. The compiler 455 is not a standard compiler but one which "understands" privacy and is able to augment the instruction tree with privacy/sensitivity information, hence assigning a privacy level to each operand in the ordered set of instructions 421. The compiler 455 can be thought of as basically creating a "blank" privacy level that is then "filled in" by the computation orchestration component 425. That is, given the "blank" template from the diagram 421, one can now decide how to use actual data, e.g., if operands either incur binary high/low privacy reduction, for which data points is it suitable to assign to high privacy reduction and for which data points is it suitable to assign to low privacy reduction. This usually requires knowing more about the privacy requirements of every data point (e.g., how much has been used/how much is left), and is performed by the computation orchestration component 425. Examples of how this might be performed are described below.

With respect to AI, the AI is this example is programmed into the user AI application 410. Although the exemplary embodiments are not limited to SGD, the SGD algorithm 411 is by far the most widely used algorithm to train AI models, e.g., object detection on images, policy learning for applications like automated driving or AlphaGo (the first computer program to defeat a professional human Go player). Typically in object detection on images, the AI model is trained by processing training images one at a time and updating the model parameters using SGD. An exemplary embodiment could be that, any time a SGD function is called, for instance in the programming language Python, instead of using random data order or specified order, a 'private' order is used and computed by the techniques presented herein.

Concerning the addition in the diagram 421 that each operand is symbolically associated with a privacy level, consider the following. Assume the user AI application 410 is a program to run an automated vehicle. This program will ingest data points. Depending on how each data point is ingested, the privacy of that data point will be impacted differently (e.g., ordering matters in SGD steps, as described previously). So there should be a way to assign data points "optimally" with regards to privacy, given the program structure (for instance, how to order shared/non-shared data in SGD steps). This can be done by considering the instructions tree produced by the compiler 455, and evaluating the sensitivity of the result to each of the inputs—each of the external operands. Then a mapping data point-to-operand is produced (e.g., non-shared data is assigned early order, shared data is assigned late order) for each data point depending on how each data point should be considered, privacy-wise.

The computation orchestration component 425, implemented by the privacy processor 460, performs the mapping. That is, the computation orchestration component 425, given the instruction diagram (e.g., the revised set of instructions in the diagram 421) and using symbolic encoding of privacy constraints such as overlap structure 416, this component 425 produces an assignment of data inputs to operands, in order to satisfy privacy constraints. This is the output 402 of the recommended ordering 435. The recommended ordering 435 is an internal output, which may be used internally and not exposed. This can, however, be exposed to the user so that he can update this ordering if needed, which would re-order the input data, and consequently the result, and also affect the privacy score of each input data point. Along the same lines, other orderings can be proposed. First, it is important to observe that typically better privacy means lower accuracy of the application (the privacy-utility tradeoff). Each ordering would have a distinct privacy guarantee for each point, and distinct accuracy. The user is then free to choose the one that makes the most sense to him or her.

The output 402 of the data point level privacy score 440 may be considered to be a sort of certificate to the user, informing him or her of how much a specific data point is impacted by this specific run, privacy-wise. That is, the data point level privacy score 440 indicates how much of the privacy of each input point is actually leaked, or more formally what the sensitivity is of the output on each input.

Regarding the privacy-aware application processing component 430, which is implemented by the privacy processor 460, this component 430 executes the application 420 by following the computation instruction diagram 421 (e.g., the revised set of instructions 421) and the assignment of data points to operands (e.g., the recommended ordering 435). The privacy-aware application processing component 430 creates an output 402 of a private collaborative result 450. This may be considered to be a trained AI application. Another way to view the result 450 is it is the result of the application 410, so if one is training an AI application 410 to complete a task, the result is the best parameter (or set of parameters, such as weights for a neural network) identified so that the AI application 410 executes the task well.

Referring to FIG. 5, which is partitioned into FIGS. 5A and 5B, this figure is a flowchart of a method for collaborative AI on transactional data with privacy guarantees. FIG. 5 also illustrates the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 5 are assumed to be performed at least in part by the core components 400, e.g., as implemented by the server computer system 610 (see FIG. 6), e.g., under control of the control module 640. For ease of reference, the computer system 610 is assumed to perform the operations in the flowchart.

One exemplary method is illustrated by blocks 505-525, and other possible implementations are illustrated by blocks 530-570. In block 505, the computer system 610 assesses data intersection of data to be used between at least two parties, wherein the data is to be used in an artificial intelligence (AI) application. In block 510, the computer system 610 evaluates a set of instructions required for the AI application, the evaluating creating a modified set of instructions where operands are symbolically associated with corresponding privacy levels. The computer system 610 computes, in block 515 and using the assessed data intersection and the modified set of instructions, a mapping from the data to operands with associated privacy metrics. The mapping treats overlapping data from the assessed data intersection differently from data that is not overlapping to improve privacy relative to without the mapping.

The computer system 610 executes the AI application using the data to produce at least one parameter of the AI application. See block 520. The computer system 610 outputs the at least one parameter for use for a trained version of the AI application in block 525.

Another possible example is illustrated by block 530, where the computer system 610 allows a user to adjust the mapping from the data to operands and performing the executing the AI application and the outputting the at least one parameter, the outputting output to the user to enable the user to see an alternative result. In block 535, the computer system 610 implements a method in which the data is not transactional data but exhibits one or more overlaps between parties.

In block 540, the computer system 610 implements a method where a system providing the data to be used between two parties specifies privacy requirements for at least some data points in the data and the computing the mapping uses the specified privacy requirements for the at least some data points in the data. The computer system 610 in block 545 performs the computing the mapping to move operands for the overlapping data to be performed later in a calculation when the AI application is executed and to move the operands for the data that is not overlapping to be performed earlier in the calculation.

In block 550, the computer system 610 performs the computing the mapping to use one or more of the overlapping data as corresponding pivots in response to public release of information being needed. The computer system 610 in block 555 implements a method where the AI application comprises a stochastic gradient descent (SGD) algorithm and the calculation is one step of the SGD algorithm. For block 560, the computer system 610 performs a method where the associated privacy metrics comprise a data point level privacy score, the data point level privacy score indicating what sensitivity is of each output data point relative to each input data point, and outputting further comprises outputting the data point level privacy score.

For block 565, the computer system 610 performs a method where the two parties are heterogeneous parties and wherein the assessing data intersection of data to be used between two parties further comprises determining in a secure way an overlap in datasets owned by the heterogeneous parties, the data to be used between two parties comprising the datasets owned by the heterogeneous parties. The computer system 610, for block 570, performs a method in which all data between the at least two parties is assumed to be private, but in response to some of the data being shared by a subset of the at least two parties, shared data subsets are treated as being logically equivalent to public data within the subset of parties. The assessing data intersection determines the shared data subsets, and the mapping treats the shared data subsets differently from data that is not shared to improve privacy relative to without the mapping.

Figure 6:
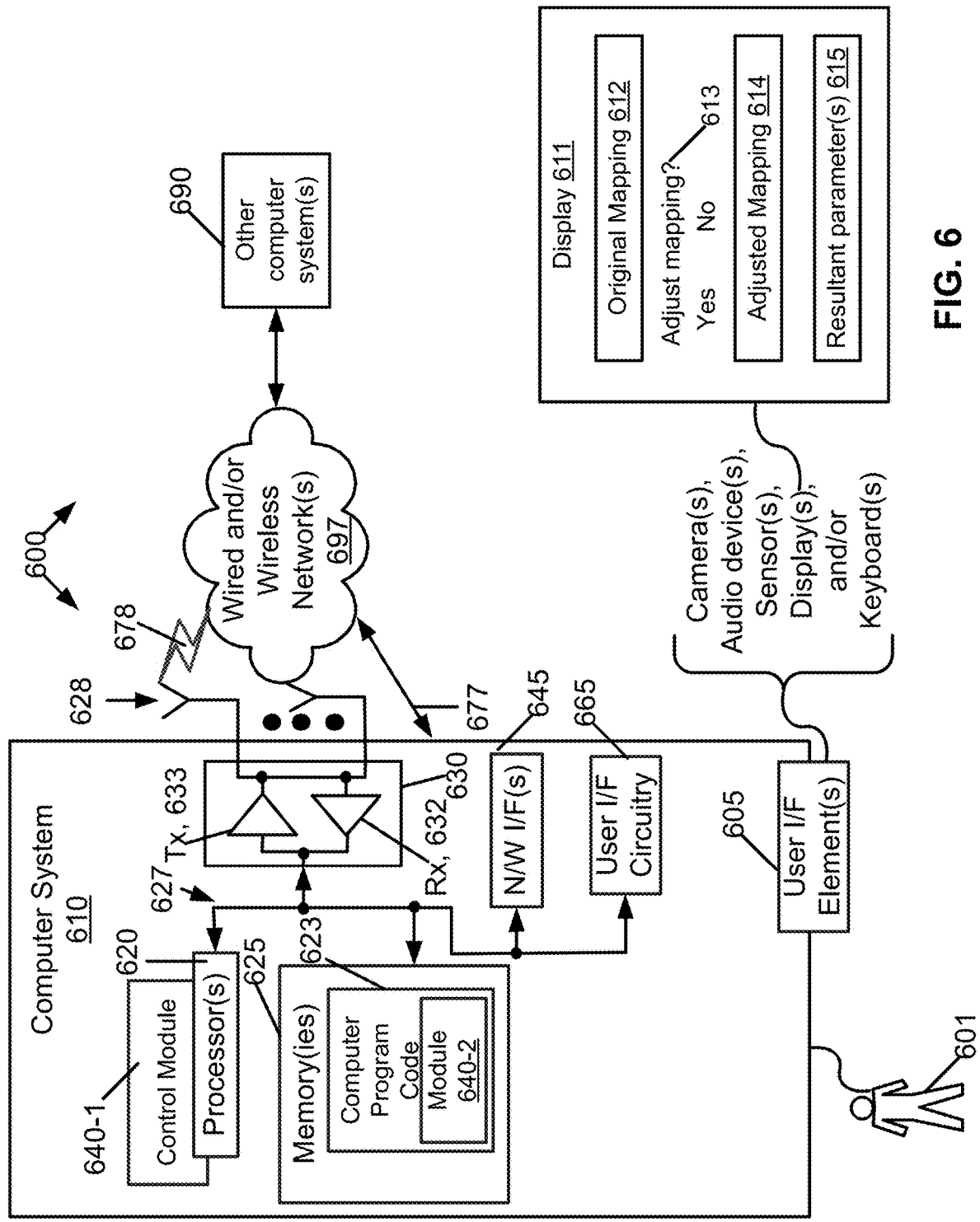
FIG. 6 is a block diagram having an illustration of an exemplary system and corresponding computer system in an exemplary embodiment.

Turning to FIG. 6, this figure shows a block diagram of one possible and non-limiting exemplary system 600 in which the exemplary embodiments may be practiced. In FIG. 6, a server computer system 610 is in wired and/or wireless communication with a wired and/or wireless network(s) 697 and through the network(s) 697 to other computer system(s) 690. The server computer system 610 could be accessible over one or more wired or wireless networks, could be implemented in the cloud, and the like. Also, a client-server relationship is not required.

The computer system 610 includes one or more processors 620, one or more memories 625, one or more transceivers 630, one or more network (N/W) interfaces (I/F(s)) 645, and user interface circuitry 665, interconnected through one or more buses 627. Each of the one or more transceivers 630 includes a receiver, Rx, 632 and a transmitter, Tx, 633. The one or more buses 627 may be address, data, and/or control buses, and may include any interconnection mechanism, such as a series of lines on a motherboard or integrated circuit, fiber optics or other optical communication equipment, and the like. The one or more transceivers 630 are connected to one or more antennas 628. The one or more memories 625 include computer program code 623.

The computer system 110 includes a control module 640, comprising one of or both parts 640-1 and/or 640-2. The control module 640 performs the operations described herein, such as to implement the core components 400 of FIG. 4, or the shared data point usage of FIG. 2, or any other operations presented herein. The control module 640 may be implemented in a number of ways. The control module 640 may be implemented in hardware as control module 640-1, such as being implemented as part of the one or more processors 620. The control module 640-1 may be implemented also as an integrated circuit or through other hardware such as a programmable gate array. In another example, the control module 640 may be implemented as control module 640-2, which is implemented as computer program code 623 and is executed by the one or more processors 620. For instance, the one or more memories 625 and the computer program code 623 may be configured to, with the one or more processors 620, cause the computer system 610 to perform one or more of the operations as described herein. It should also be noted that the devices shown in the computer system 610 are not limiting and additional, different, or fewer devices may be used.

The user interface circuitry 665 communicates with one or more user interface elements 605, which may be formed integral with the computer system 610 or be outside the computer system 610 but coupled to the computer system 610. The interface elements 605 include one or more of the following: one or more camera(s); one or more audio device(s) (such as microphone(s), speaker(s), and the like); one or more sensor(s) (such as GPS sensor(s), fingerprint sensor(s), orientation sensor(s), and the like); one or more displays; and/or one or more keyboards. This list is not exhaustive or limiting, and other, different, or fewer elements may be used. A user 601 (a human being in this example) may interact with the computer system 610, e.g., to cause the system 610 to take certain actions. These operations may also be caused by the computer system 610, in combination with actions by the user 601 or without actions by the user 601. The computer system 610 communicates with the other computer system(s) 690 via the one or more wired or wireless networks 697, via one or both of wired link 677 and wireless link 678.

FIG. 6 also provides an illustration of block 530 of FIG. 5, where the computer system 610 allows a user to adjust the mapping from the data to operands and performing the executing the AI application and the outputting the at least one parameter, the outputting output to the user to enable the user to see an alternative result. Display 611 shows an original mapping 612. Reference 613 shows that the computer system 610 requests whether the user wants to adjust the mapping 612. The user 601 can select "Yes" or "No". Assuming that "Yes" is selected, the computer system 610 will display the adjusted mapping 614 and also the corresponding resultant parameter(s) 615.

5. COMPUTATION ORIENTION EXAMPLES

This section relates to possible examples for performing the computation orchestration, as performed, e.g., by the privacy processor 460 and its computation orchestration component 425.

5.1 Preliminaries

This section contains information for preliminary information that is used to create the main results described below.

5.1.1 Privacy Amplification by Iteration

Consider algorithms $A:D \mapsto R$ mapping a data space D to a distribution space R. The Renyi differential privacy introduced in [14] can be defined as follows.

Definition 1. (See [14].) A randomized algorithm $A:D \mapsto R$ is ε-Renyi differentially private of order α, or (α,ε)-RDP, if for any adjacent dataset D, D'∈ D, it holds true that:

$$D_\alpha(A(D) \| A(D')) \leq \varepsilon, \quad (1)$$

with $$D_\alpha(P \| Q) = \frac{1}{\alpha - 1} \log_2 E_{x:Q} \left( \frac{P(x)}{Q(x)} \right)^\alpha$$

the Renyi divergence.

The Renyi-divergence satisfies the data processing inequality $D_\alpha(g(P) \| g(Q)) \leq D_\alpha(P \| Q)$ for a randomized mapping g. In the case of contractive noisy iterations, much stronger bounds are provided by privacy amplification by iteration [7].

Theorem 1. (See [7].) Let $K \subset R^d$ be a convex set and $\{f(\cdot, x)\}_{x \in X}$ be a family of convex L-Lipschitz. Then, if the gradient descent step is contractive, for every σ>0, α>1, t∈ [n], starting point $w_0 \in K$, the projected noisy stochastic gradient descent satisfies $$\left( \alpha, \alpha \frac{2L^2}{\sigma^2} \frac{1}{n+1-t} \right) \text{-RDP}$$

for its $t^{th}$ input.

A key aspect of this result is that the sample-specific RDP guarantee, where each sample is identified by its processing order. In [7], the authors mention that in this setting, if the dataset from one distribution contains private and public data, the public data should be processed last, as the later the processing, the worse the privacy guarantee. Herein, this is extended to the collaborative setting, in which the contextually public nature of the data depends on the communication protocol.

In additional detail, exemplary embodiments herein build on the technical result in [7] and apply the result in a collaborative setting in which all data is private, but when some of the data is shared by a subset of parties, these shared data subsets are logically equivalent to public data within the subset of parties—hence can be used to protect the non-shared data within the subset of parties. This implies, as described herein, that the order in which parties exchange data in a collaborative setting impacts the privacy guarantee of the protocol. Given that the idea in [7] is useful only when input data points have distinct privacy requirements, the general case is instead considered here, when input data points have distinct privacy requirements. Specifically, the case of programs (not considered in [7]) is considered herein—in which the data set may not be processed sequentially—and a proposal is made herein to augment compilers with the privacy exposure of each operand/data point. Hence, the exemplary embodiments herein achieve generality on the class of algorithms that can be considered. In that setting, associating data points to operands is proposed to minimize privacy, which is clearly possible since the exemplary embodiments can evaluate the privacy score of an assignment data point to operand.

5.1.2 Collaborative Renyi Differential Privacy (CRDP)

The differential privacy definition involves the consideration of adjacent datasets, meant to correspond to atomic changes resulting from the action of a single individual or logical entity.

In a centralized/local differential privacy setting, an external user is querying the centralized/local dataset, and given a vector representation of the data, this notion applies to any pair of data points with Hamming distance one. It is highlighted that this definition possibly includes the data from the user making the query, although it is superfluous to control the dependency of the queries to the data associated with the user making the query.

In a collaborative setting in which parties both hold data and make queries, this distinction is very relevant. Indeed, collaborating users may own not only data that they are the only ones to own, but also data that is overlapping with data from other parties, hence the traditional definition of differential privacy would require controlling sensitivity of queries on data that they already own.

Let $(D_1, \ldots, D_m)$ denote the distributed dataset, with $D_i$ the dataset owned by party i. Let $G_m = (V, E)$ denote the fully connected graph with m vertices, where each party is represented as a vertex. It now defined how parties run a collaborative computation.

Definition 2. A distributed algorithm is defined as a pair algorithm, communication structure (A,C) where the communication structure C is defined as an ordered set of mapping $c_i: V \mapsto 2^V$ defining a communication from a vertex k to a set of vertices $c_i(k)$, and where the algorithm A is defined as an ordered set of local algorithms $A_i: D_k \mapsto R$.

A distributed algorithm involves a set of releases from output distribution $A_i(D_k)$ by party k to the set of parties $c_i(k)$. A notation of privacy of a collaborative protocol can then be defined.

Definition 3. Given m parties, a distributed algorithm (A,C) is ε-collaborative Renyi differentially private (CRDP) of order α, or (α,ε)-CRDP, if for any mapping $c: i \mapsto C_i \in C$, if we note $O_i = D_i \cap D_{C_i}$ the overlapping data for communication step c, for any adjacent dataset A, A'∈ D, then:

$$D_\alpha(A_i(A \cup O_i) \| A_i(A' \cup O_i)) \leq \varepsilon. \qquad (2)$$

This definition implies that, given overlapping datasets and a communication structure, if the algorithm executed by the data sender is RDP in the local model on the data that he is the only one to possess, then the collaborative protocol is CRDP.

The above is of interest only when the overlapping samples between multiple parties are already known a-priori or if the parties can discover overlapping samples without revealing additional information. Overlap structure can be discovered using private set intersection, for which secure and reasonably efficient protocols are available [9].

The relation between differential privacy in the collaborative and the local model is now formulated.

Proposition 1. Consider a $(\alpha,\varepsilon)$-CRDP distributed algorithm (A,C). Each step $(A_i,C_i)$, consisting of processing data $D_k$ by party k, and sending the result to the set of parties $c_i(k)$, is $(\alpha,\varepsilon)$-RDP on the data solely owned by party k, in the local differential privacy model.

Proof 1. This follows from definition of CRDP, given the user making the query at step $(A_i,C_i)$ is explicitly identified and the query made private with respect to his knowledge. Receiving party at step i then continues the computation, and protects his private data from the receiving party at step i+1, hence protects the result from the computation at step i from receiving party at step i+1 as well.

Given that the overall privacy guarantee depends on the level of privacy that can be obtained at each communication step, it is of interest to analyze and compare various communication structures.

5.1.3 Communication Structures for Collaboration

In this section, Hamiltonian cycle and full broadcast communication structures are defined. Set the edge weights of $G_m$ to be inversely proportional to the number of overlapping samples between the corresponding parties, plus one.

Two characteristic communication structures are the Hamiltonian cycle and the full broadcast.

Definition 4. Given a permutation $\pi: V \mapsto V$ of the node set, the communication structure defined by the set of mappings $\{\pi(v_1) \mapsto \pi(v_2), \ldots, \pi(v_{|V|-1}) \mapsto \pi(v_{|V|}), \pi(v_{|V|}) \mapsto \pi(v_1)\}$ is called a Hamiltonian cycle communication structure.

Definition 5. Let $v \in V$, if one notes $V_{-v}$ the complementary set of $\{v\}$ in V, the communication structure defined by the set of mappings $v \mapsto V_{-v}$, for $v \in V$ is called a full broadcast communication structure.

5.1.4 A Simple Model for Overlapping Samples

For the sake of analysis, a model is defined of overlapping samples. Consider that each party builds his knowledge from some data which is already in the public domain, while other data is obtained by random sampling from the world and labeling as private data. For instance, consider the problem of multi-party training of a face recognition system. The collaborating parties may have access to standard public domain dataset, e.g., IARPA Janus Benchmark. The IARPA Janus Benchmark A (IJB-A) is part of the National Institute of Standards and Technology Face Challenges, an ongoing evaluation activity to support the face recognition research community. The parties may also individually collect face images from the web and add face images not available on the web, the former sometimes labeled private, and the latter always labeled private.

Definition 6. Given a discrete data space D of cardinality N, we assume that a subset $P \subset D$ of cardinality P of the data is public, and available to all parties, and is completed by each of the m parties by a dataset considered private and of cardinality n, obtained by sampling with replacement from D\P.

Here P corresponds to data labeled public while D\P corresponds to any data point that is eventually labeled private.

Proposition 2. Given the data generation process from Definition 6, the count of overlapping samples between k parties can be expressed as:

$$\left| \bigcap_{i=1}^{k} D_i \right| = O\left(P + (N-P)\left(\frac{n-P}{N-P}\right)^k\right) \qquad (3)$$

and when P/N is small, i.e. the volume of public data is small, the expression of the cardinality reduces to:

$$\left| \bigcap_{i=1}^{k} D_i \right| = O\left(N\left(\frac{n}{N}\right)^k\right) \qquad (4)$$

The data generation process outlined in Definition 6 has the important property that the overlapping structure is independent from the class labels. This means that we can process the dataset in an arbitrary order without impacting its performance 5.2. Exemplary Results In this section, the overlap privacy guarantee that can be obtained for specific communication structures is analyzed.

5.2.1 CRDP of a Single SGD Step

In this section, one step of a collaborative learning algorithm is analyzed based on SGD in the CRDP model.

Theorem 2. Under the assumptions of Theorem 1, given m parties, and a distributed algorithm (A,C) such that step i involves computation $A_i$ on data $D_{k(i)}$ and communication of the results from party k to the set of parties $c_i(k)$. If we note $m_i = 1 + |c_i(k)|$ the number of interacting parties at step i, and the size of the intersection of their datasets as $$o_i = \left| \bigcap_{j \in \{(k)\} \cup c_i(k)\}} D_j \right|, \qquad (5)$$

if the noise level $\sigma_i$ for step i is chosen such that:

$$\sigma_i^2 \geq O\left(\frac{2L^2}{\varepsilon(1+o_i)}\right), \qquad (6)$$

then step i of the algorithm is $(\alpha,\varepsilon)$-CRDP.

It is observed that arranging the algorithm steps to increase the size of the overlapping set can yield significantly improved ε. Specific communication structures are considered next.

5.2.1.1 Full Broadcast Communication Structure

In this section, the full broadcast protocol from Definition 5 is considered. This protocol is the most commonly used, for instance in federated learning [11]. At each step, each party broadcasts his update to all other parties.

Corollary 1. Under the data generation process from Definition 6, step i of the algorithm with full broadcast communication structure is $(\alpha,\varepsilon)$-CRDP if the Gaussian noise satisfies:

$$\sigma_{b,i}^2 \geq O\left(\frac{2L^2}{\varepsilon} \frac{N^{m-1}}{N^{m-1}+n^m}\right).$$

Figure 7:
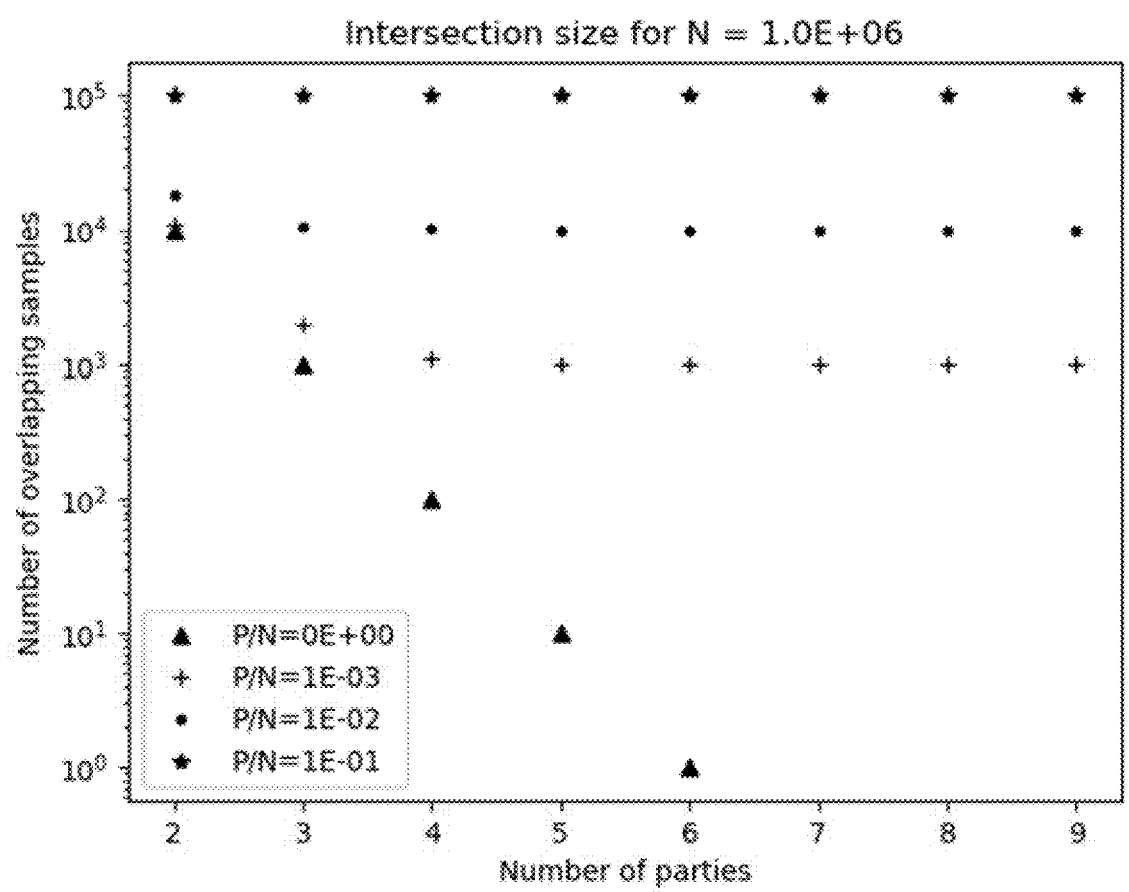
FIG. 7 illustrates a number of overlapping samples according to the data generation model from Definition 6 when the parties have sampled the entire space, $n=N/m$, as a function of the number of parties.

In the context of the data generation process from Definition 6, FIG. 7 visualizes the dependency of bound (1) on N and m, and the size of the public data set. FIG. 7 illustrates a number of overlapping samples according to the data generation model from Definition 6 when the parties have sampled the entire space, n=N/m, as a function of the number of parties.

Under the data generation process, the size of the random overlap decreases exponentially fast. However, even under this model and with no public data, for a collaboration involving less than 5 entities having samples the full data space of about 1 million data points, the overlapping set size is larger than 10.

Under more natural cases such as the ones discussed in Section 2 above, where the nature of the application implies data sharing (for instance working with transactional data), the overlap can be expected to be more significant.

5.2.1.2 Hamiltonian Cycle Communication Structure

In this section, the Hamiltonian cycle communication structure $C_s$ from Definition 4 is considered. Collaborative stochastic gradient descent with Hamiltonian cycle communication is defined in Algorithm 1. FIG. 8 is an algorithm (Algorithm 1) of collaborative SGD via Hamiltonian cycle (HC), where each party processes his truly private data first, then the data he shares with the next party, and at the end of one cycle, the last party holds the estimate.

The Hamiltonian cycle considered herein is arbitrary, but practically a Hamiltonian cycle with low induced additive noise should be preferred, which requires prioritizing communications between parties with large overlap. A heuristic solver for the problem can be used to identify suitable Hamiltonian cycles.

All communications steps of Algorithm 1 involve communication from one party to another party.

Corollary 2. Under the data generation process from Definition 6, step i of the algorithm with Hamiltonian cycle communication structure is $(\alpha,\varepsilon)$-CRDP if the Gaussian noise satisfies:

$$\sigma_{hc,i}^2 \geq O\left(\frac{2L^2}{\varepsilon} \frac{N}{N+n^2}\right).$$

Under this model, the parties need to have more communication steps in order to synchronize the results, with m communication steps to allow each party to receive an update. For small number of parties the dependency on m remains preferable to the full broadcast structure.

5.3. Discussion

A relaxed security model has been considered that hinges on the specific properties of the collaborative setting, in which all parties are identified, and are willing to collaborate and often happen to have overlap in their private data.

It is believed that similar studies in which the notion of private/public data is refined, offer meaningful promises for improvements of the privacy-utility trade-off. The notion of public and private data considered here could be extended to continuum in order to capture more fine-grained notions of privacy.

Specific relevant extensions include the analysis of optimal communication structures, as well as impact of processing data in an order dependent on the overlap structure on the learning performance.

5.4 References

The following are the references that have been referred to above.

[1] Martin Abadi, Andy Chu, Ian Goodfellow, H Brendan McMahan, Ilya Mironov, Kunal Talwar, and Li Zhang. Deep learning with differential privacy. In Proceedings of the 2016 ACM SIGSAC Conference on Computer and Communications Security, pages 308-318. ACM, 2016.

[2] Borja Balle, Gilles Barthe, and Marco Gaboardi. Privacy amplification by subsampling: Tight analyses via couplings and divergences. In Advances in Neural Information Processing Systems, pages 6280-6290, 2018.

[3] Raef Bassily, Adam Smith, and Abhradeep Thakurta. Differentially private empirical risk minimization: Efficient algorithms and tight error bounds. arXiv preprint arXiv:1405.7085, 2014.

[4] Kamalika Chaudhuri, Claire Monteleoni, and Anand D Sarwate. Differentially private empirical risk minimization. Journal of Machine Learning Research, 12(March): 1069-1109, 2011.

[5] Cynthia Dwork, Frank McSherry, Kobbi Nissim, and Adam Smith. Calibrating noise to sensitivity in private data analysis. In Theory of cryptography conference, pages 265-284. Springer, 2006.

[6] Úlfar Erlingsson, Vitaly Feldman, Ilya Mironov, Ananth Raghunathan, Kunal Talwar, and Abhradeep Thakurta. Amplification by shuffling: From local to central differential privacy via anonymity. In Proceedings of the Thirtieth Annual ACM-SIAM Symposium on Discrete Algorithms, pages 2468-2479. SIAM, 2019.

[7] Vitaly Feldman, Ilya Mironov, Kunal Talwar, and Abhradeep Thakurta. Privacy amplification by iteration. In 2018 IEEE 59th Annual Symposium on Foundations of Computer Science (FOCS), pages 521-532. IEEE, 2018.

[8] Shiva Prasad Kasiviswanathan, Homin K Lee, Kobbi Nissim, Sofya Raskhodnikova, and Adam Smith. What can we learn privately? SIAM Journal on Computing, 40(3):793-826, 2011.

[9] Vladimir Kolesnikov, Naor Matania, Benny Pinkas, Mike Rosulek, and Ni Trieu. Practical multi-party private set intersectionfrom symmetric-key techniques. In Proceedings of the 2017 ACM SIGSAC Conference on Computer and Communications Security, pages 1257-1272, Dallas, USA, October 2017.

[10] Ryan McDonald, Keith Hall, and Gideon Mann. Distributed training strategies for the structured perceptron. In Human Language Technologies: The 2010 Annual Conference of the North American Chapter of the Association for Computational Linguistics, pages 456-464. Association for Computational Linguistics, 2010.

[11] Brendan McMahan, Eider Moore, Daniel Ramage, Seth Hampson, and Blaise Aguera y Arcas. Communication-efficient learning of deep networks from decentralized data. In Artificial Intelligence and Statistics, pages 1273-1282, 2017.

[12] H Brendan McMahan, Daniel Ramage, Kunal Talwar, and Li Zhang. Learning differentially private recurrent language models. 2018.
[13] Kentaro Minami, HItomi Arai, Issei Sato, and Hiroshi Nakagawa. Differential privacy without sensitivity. In Advances in Neural Information Processing Systems, pages 956-964, 2016.
[14] Ilya Mironov. Rényi differential privacy. In 2017 IEEE 30th Computer Security Foundations Symposium (CSF), pages 263-275. IEEE, 2017.
[15] Kobbi Nissim, Sofya Raskhodnikova, and Adam Smith. Smooth sensitivity and sampling in private data analysis. In Proceedings of the thirty-ninth annual ACM symposium on Theory of computing, pages 75-84. ACM, 2007.
[16] Manas Pathak, Shantanu Rane, and Bhiksha Raj. Multiparty differential privacy via aggregation of locally trained classifiers. In Advances in Neural Information Processing Systems, pages 1876-1884, 2010.
[17] Reza Shokri and Vitaly Shmatikov. Privacy-preserving deep learning. In Proceedings of the 22nd ACM SIGSAC conference on computer and communications security, pages 1310-1321. ACM, 2015.
[18] Adam Smith. Privacy-preserving statistical estimation with optimal convergence rates. In Proceedings of the forty-third annual ACM symposium on Theory of computing, pages 813-822. ACM, 2011.
[19] John Tsitsiklis, Dimitri Bertsekas, and Michael Athans. Distributed asynchronous deterministic and stochastic gradient optimization algorithms. IEEE transactions on automatic control, 31(9):803-812, 1986.
[20] Martin Zinkevich, Markus Weimer, Lihong Li, and Alex J Smola. Parallelized stochastic gradient descent. In Advances in neural information processing systems, pages 2595-2603, 2010.

6. FURTHER COMMENTS

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   assessing data intersection of data from at least two parties to determine overlapping data and data that does not overlap, wherein the data is to be used for collaboration between the at least two parties using an artificial intelligence (AI) application;
   evaluating a set of instructions required for execution of the AI application, the evaluating creating a modified set of instructions for the AI application where operands are symbolically associated with corresponding privacy levels;
   computing, using the assessed data intersection and the modified set of instructions, a mapping from the data to operands with associated privacy metrics, wherein operands are symbolically associated with privacy levels, the mapping treating overlapping data from the assessed data intersection differently from data that is not overlapping to improve privacy relative to without the mapping and producing an ordering for assigning data inputs to operands;
   executing the AI application, using the data, the modified set of instructions, and the mapping, to produce at least one parameter of the AI application;
   outputting the at least one parameter; and
   producing a trained version of the AI application based on the at least one parameter.

2. The method of claim 1, further comprising allowing a user to adjust the mapping from the data to operands, and therefore the ordering for assigning data inputs to operands, and performing the executing the AI application and the outputting the at least one parameter, the outputting output to the user to enable the user to see an alternative result.

3. The method of claim 1, in which the data is not transactional data but exhibits one or more overlaps between parties.

4. The method of claim 1, wherein a system providing the data to be used between two parties specifies privacy requirements for at least some data points in the data and the computing the mapping uses the specified privacy requirements for the at least some data points in the data.

5. The method of claim 1, wherein the computing the mapping and producing an ordering for assigning data inputs to operand is performed to move operands for the overlapping data to be performed later in a calculation when the AI application is executed and to move the operands for the data that is not overlapping to be performed earlier in the calculation when the AI application is executed.

6. The method of claim 5, wherein the AI application comprises a stochastic gradient descent (SGD) algorithm and the calculation is one step of the SGD algorithm.

7. The method of claim 1, wherein the computing the mapping is performed to use one or more of the overlapping data as corresponding pivots in response to public release of information being needed.

8. The method of claim 1, wherein the associated privacy metrics comprise a data point level privacy score, the data point level privacy score indicating what sensitivity is of each output data point relative to each input data point, and outputting further comprises outputting the data point level privacy score.

9. The method of claim 1, wherein the two parties are heterogeneous parties and wherein the assessing data intersection of data to be used between two parties further comprises determining in a secure way an overlap in datasets owned by the heterogeneous parties, the data to be used between two parties comprising the datasets owned by the heterogeneous parties.

10. The method of claim 1, in which all data between the at least two parties is assumed to be private, but in response to some of the data being shared by a subset of the at least two parties, shared data subsets are treated as being logically equivalent to public data within the subset of parties, wherein the assessing data intersection determines the shared data subsets, and wherein the mapping treats the shared data subsets differently from data that is not shared to improve privacy relative to without the mapping.

11. An apparatus, comprising:
   one or more memories having computer-readable code thereon; and
   one or more processors, the one or more processors, in response to retrieval and execution of the computer-readable code, causing the apparatus to perform operations comprising:
   assessing data intersection of data from at least two parties to determine overlapping data and data that does not overlap, wherein the data is to be used for collaboration between the at least two parties using an artificial intelligence (AI) application;
   evaluating a set of instructions required for execution of the AI application, the evaluating creating a modified set of instructions for the AI application where operands are symbolically associated with corresponding privacy levels;
   computing, using the assessed data intersection and the modified set of instructions, a mapping from the data to operands with associated privacy metrics, wherein operands are symbolically associated with privacy levels, the mapping treating overlapping data from the assessed data intersection differently from data that is not overlapping to improve privacy relative to without the mapping and producing an ordering for assigning data inputs to operands;

executing the AI application using the data, the modified set of instructions, and the mapping, to produce at least one parameter of the AI application;

outputting the at least one parameter; and producing a trained version of the AI application based on the at least one parameter.

12. The apparatus of claim 11, wherein the one or more processors, in response to retrieval and execution of the computer-readable code, cause the apparatus to perform operations comprising: allowing a user to adjust the mapping from the data to operands, and therefore the ordering for assigning data inputs to operands, and performing the executing the AI application and the outputting the at least one parameter, the outputting output to the user to enable the user to see an alternative result.

13. The apparatus of claim 11, in which the data is not transactional data but exhibits one or more overlaps between parties.

14. The apparatus of claim 11, wherein a system providing the data to be used between two parties specifies privacy requirements for at least some data points in the data and the computing the mapping uses the specified privacy requirements for the at least some data points in the data.

15. The apparatus of claim 11, wherein the computing the mapping and producing an ordering for assigning data inputs to operand is performed to move operands for the overlapping data to be performed later in a calculation when the AI application is executed and to move the operands for the data that is not overlapping to be performed earlier in the calculation when the AI application is executed.

16. The apparatus of claim 15, wherein the AI application comprises a stochastic gradient descent (SGD) algorithm and the calculation is one step of the SGD algorithm.

17. The apparatus of claim 11, wherein the computing the mapping is performed to use one or more of the overlapping data as corresponding pivots in response to public release of information being needed.

18. The apparatus of claim 11, wherein the associated privacy metrics comprise a data point level privacy score, the data point level privacy score indicating what sensitivity is of each output data point relative to each input data point, and outputting further comprises outputting the data point level privacy score.

19. The apparatus of claim 11, wherein the two parties are heterogeneous parties and wherein the assessing data intersection of data to be used between two parties further comprises determining in a secure way an overlap in datasets owned by the heterogeneous parties, the data to be used between two parties comprising the datasets owned by the heterogeneous parties.

20. The apparatus of claim 11, in which all data between the at least two parties is assumed to be private, but in response to some of the data being shared by a subset of the at least two parties, shared data subsets are treated as being logically equivalent to public data within the subset of parties, wherein the assessing data intersection determines the shared data subsets, and wherein the mapping treats the shared data subsets differently from data that is not shared to improve privacy relative to without the mapping.

* * * * *